Patented Feb. 7, 1939

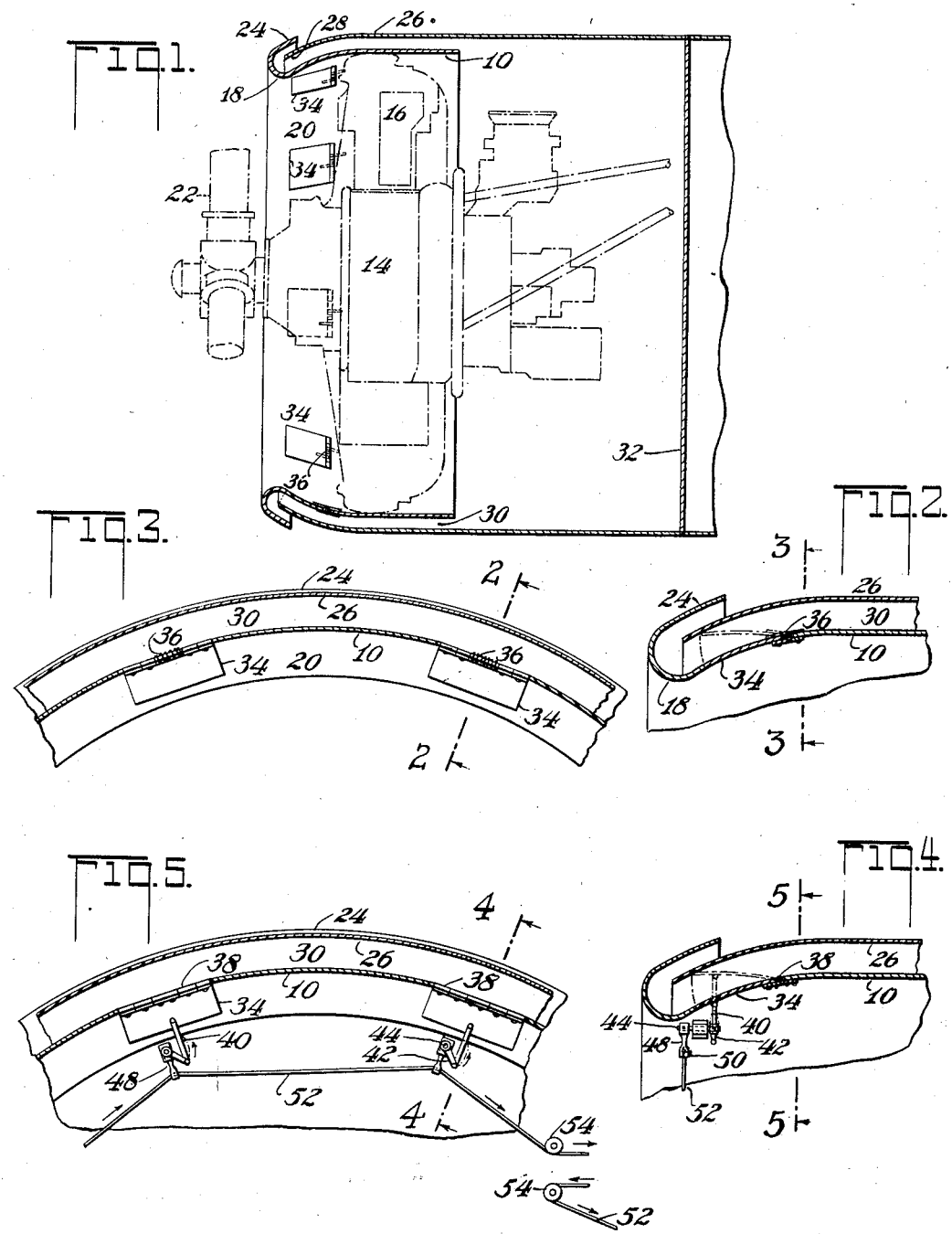

2,146,523

UNITED STATES PATENT OFFICE 2,146,523

COWLING

Maitland B. Bleecker, Upper Montclair, and Godfrey B. Speir, Glen Rock, N. J., assignors to Wright Aeronautical Corporation, a corporation of New York Application September 9, 1937, Serial No. 163,022

9 Claims. (Cl. 123—171)

This invention relates to cowling for radial cylinder aircraft engines, and particularly comprises improvements for controlling the cooling airflow passing over the engine.

The improvements are particularly applicable to the so-called "reverse flow" cowling, wherein an axle air entrance opening in the cowling ahead of the engine provides for entrainment of cool air, and wherein an annular exit opening surrounds the air entrance opening, being connected by an annular duct to a closed compartment rearward of the engine.

An object of the invention is to provide means for controlling cooling airflow by means which are substantially entirely covered and which are removed from the exterior parts of the power plant, whereby minimum interference with aerodynamic characteristics of the system is effected. A further object is to provide a cowling control system which is substantially enclosed and is thus relatively free from the possibility of damage or non-functioning due to weather conditions, handling and other extraneous influences. Still another object of the invention is to provide a cooling air control which is automatic in operation in response to airspeed, the latter being one of the principal criteria for cooling airflow control. Further objects of the invention will be apparent, or will be pointed out in the detailed description below in connection with the drawing in which similar characters indicate similar parts and in which Fig. 1 is an axial section through an aircraft cowling according to the invention, showing, diagrammatically, the relation of the power plant thereto; Fig. 2 is fragmentary axial section, enlarged, of part of the cowling, being a section on the line 2—2 of Fig. 3, Fig. 3 is a section on the line 3—3 of Fig. 2; Fig. 4 is a section on the line 4—4 of Fig. 5; and Fig. 5 is a section on the line 5—5 of Fig. 4, the latter two figures showing an alternative control system for the invention.

The cowling depicted is known as a "reverse flow" type, comprising a first annulus 10 embracing the radial cylinders 12 of a power plant 14, the engine being provided with inter-cylinder baffles indicated at 16 which serve to substantially close off the open spaces between the cylinders so that airflow through the engine is confined to the cylinder surfaces. The cowling 10 extends a slight distance rearwardly of the plane of the cylinders and a substantial distance forwardly thereof, the leading edge 18 defining an axial air entrance opening to entrain cooling air. The space 20 within the cowling and forward of the engine acts as a pressure reservoir for air, by virtue of the ramming effect of the airplane forward speed and the action of the propeller 22 in front of the cowling.

The forward edge of the cowling 10 is curved outwardly and back upon itself as at 24, and a second cowling 26 embracing the first cowling 10 and spaced therefrom, terminates at its forward edge 28 within the curve 24. Between the two cowlings an annular air exit duct 30 is formed, air in the rear of the engine passing forwardly through this duct, whence it is issued to the surrounding atmosphere between the cowling edges 24 and 28, the opening thereat being rearwardly faced and in a zone of low pressure when the aircraft is in flight. The outer cowling 26 extends rearwardly of the cowling 10, providing part of the power plant nacelle or body form, and being closed or sealed at its rearward end by a diaphragm or firewall 32.

In operation, air pressure in the reservoir 20 will be relatively high, while pressure in the duct 30 will be low, the differential being an index of cooling airflow through the engine. In high speed flight, the differential will be high, producing an excessive cooling of the engine, while, under low speed, full power conditions, the cooling is of proper amount. To control the amount of cooling air, we place a plurality of circumferentially disposed, outwardly opening doors 34 in the cowling 10 between the engine 14 and the air entrance 18. When these doors are closed, the cowling assembly operates in the conventional manner, but when opened, the doors cut down the flow of cooling air in a dual manner. First, they restrict the effective area of the air exit duct 30, building up back pressure behind the engine and lowering the pressure differential across the engine, and second, they bleed air directly from the pressure reservoir 20 to the exit duct 30, further tending to lower the pressure differential.

Figs. 2 and 3 show automatic means for controlling the doors 34, comprising spring hinges 36 normally urging the doors to a closed position. The value of the springs is so chosen that the doors 34 will be held closed up to aircraft speeds where the full pressure differential is needed for proper engine cooling. At higher speeds, the pressure differential increases, this differential acting on the doors and overcoming the spring hinges 36 whereby the doors open, restricting the exit duct 30 and bleeding air from the reservoir 20 so that the proper cooling airflow pressure differential is automatically maintained.

Figs. 4 and 5 show a manual means for opening and closing the doors 34, the doors being hinged at 38, at their rearward edges, and each having an inwardly extending pivoted link 40 near its forward edge. Each link is pivoted to a lever 42 carried on a shaft 44 journalled in a bracket 46 fixed to the cowling 10, the shaft 44 having an inwardly extending lever 48 provided with a cable clamp 50 through which a cable 52 is passed, adjusted, and clamped. The one cable 52 runs through all of the several levers 48, assuming a polygonal position within the cowling, and is passed over sheaves 54 to a suitable cockpit control. In the showing of Fig. 5, clockwise movement of the cable will cause simultaneous counter-clockwise movement of the individual shafts 44 and simultaneous opening of the doors 34. Counter-clockwise cable movement will cause closing of the doors.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In cowling for an air cooled radial engine, a ring cowl embracing the engine extending from a point forward of the engine to a point rearward thereof, the forward cowl portion being outwardly flanged and defining an air entrance opening within the ring cowl leading edge, a second engine embracing cowling annularly spaced from and overlapping the first having its rearward portion defining a substantially closed air containing compartment and having its forward edge spaced from and embraced by the outwardly flanged portion of said first cowl to define therewith a forward annular air exit opening, the space between said cowls defining an air exit duct opening to the engine compartment rearward of the engine, and doors in said first cowl, between its leading edge and the engine, operable to establish direct communication from the interior of said first cowl to said air exit duct.

2. In an aircooled radial aircraft power plant including an engine, a double annular engine embracing cowling, comprising an inner cowl defining an air entrance duct and air containing reservoir forward of the engine and an outer cowl overlapping and defining with said inner cowl an annular air exit duct between the overlap and an air exit opening at the forward end of said outer cowl, said duct being normally subject to a pressure, in operation, less than the pressure within the inner cowl, said duct being open to the compartment rearward of the engine; and doors in said inner cowl openable to bleed air from said air containing reservoir to said exit duct, said doors being located to by-pass air within said reservoir before it passes over the engine.

3. In an aircooled radial aircraft power plant including an engine, a double annular engine embracing cowling, comprising an inner cowl defining an air entrance duct and air containing reservoir forward of the engine and an outer cowl overlapping and defining with said inner cowl an annular air exit duct between the overlap and an air exit opening at the forward end of said outer cowl, said duct being normally subject to a pressure, in operation, less than the pressure within the inner cowl, said duct being open to the compartment rearward of the engine; and doors in said inner cowl openable to bleed air from said air containing reservoir to said exit duct, said doors being located to by-pass air within said reservoir before it passes over the engine, said doors being responsive in their opening to the pressure differential between said reservoir and said exit duct.

4. In an engine air-cooling system, an inner engine embracing cowl defining an air entrance opening and an air pressure zone ahead of the engine, an outer cowling embracing and overlapping the inner cowling defining therewith an air exit duct between said overlap and an air exit opening at the forward end of the outer cowling, said outer cowl defining a compartment rearward of the engine which communicates with said duct, said inner cowling forming a common wall between said duct and zone, and means in said common wall for bypassing air from said zone to said duct.

5. In an engine air-cooling system, an inner engine embracing cowl defining an air entrance opening and an air pressure zone ahead of the engine, an outer cowling embracing and overlapping the inner cowling defining therewith an air exit duct between said overlap and an air exit opening at the forward end of the outer cowling, said outer cowl defining a compartment rearward of the engine which communicates with said duct, said inner cowling forming a common wall between said duct and zone, and means in said common wall for bypassing air from said zone to said duct, said means comprising outwardly opening doors organized, when closed, to prevent said bypassing, and organized when open, to restrict the effective area of said duct.

6. In combination with a radial cylinder aircooled engine having baffles for confining airflow thereby to the cylinder surfaces, an annular engine embracing cowling defining an air entrance opening at its leading edge and comprising, forward of the engine, a pressure air reservoir said cowling being turned outwardly and rearwardly at its leading edge, an annular cowling embracing and overlaping the first cowling and spaced therefrom, to define an air exit duct and an air exit opening between it and the first cowling, said second cowling having a closure at its rearward end defining a compartment rearward of the engine into which cooling air flowing over the engine passes, said air exit duct being open to said compartment, and doors circumferentially disposed in said first cowling forward of the engine, openable to bleed air from said reservoir to said air exit duct to prevent the by-passed air from flowing over the engine.

7. In combination with a radial cylinder aircooled engine having baffles for confining airflow thereby to the cylinder surfaces, an annular engine embracing cowling defining an air entrance opening at its leading edge and comprising, forward of the engine, a pressure air reservoir, said cowling being turned outwardly and rearwardly at its leading edge, an annular cowling embracing and overlapping the first cowling and spaced therefrom, to define an air exit duct and an air exit opening between it and the first cowling, said second cowling having a closure at its rearward end defining a compartment rearward of the engine into which cooling air flowing over the engine passes, said air exit duct being open to said compartment, and doors circumferentially disposed in said first cowling, forward of the engine, openable to bleed air from said reservoir to said air exit duct to prevent the by-passed air from flowing over the engine, said doors opening outwardly.

into said duct and when open, restricting the effective area thereof.

8. In combination with a radial cylinder air-cooled engine having baffles for confining airflow thereby to the cylinder surfaces, an annular engine embracing cowling defining an air entrance opening at its leading edge and comprising forward of the engine, a pressure air reservoir, said cowling being turned outwardly and rearwardly at its leading edge, an annular cowling embracing and overlapping the first cowling and spaced therefrom, to define an air exit duct and an air exit opening between it and the first cowling, said second cowling having a closure at it rearward end defining a compartment rearward of the engine into which cooling air flowing over the engine passes, said air exit duct being open to said compartment, doors circumferentially disposed in said first cowling, forward of the engine, openable to bleed air from said reservoir to said air exit duct to prevent the by-passed air from flowing over the engine, and resilient means urging said doors toward a position flush with the first cowling.

9. In combination with a radial cylinder air-cooled engine having baffles for confining airflow thereby to the cylinder surfaces, an annular engine embracing cowling defining an air entrance opening at its leading edge and comprising, forward of the engine, a pressure air reservoir, said cowling being turned outwardly and rearwardly at its leading edge, an annular cowling embracing and overlapping the first cowling and spaced therefrom to define an air exit duct and an air exit opening between it and the first cowling, said second cowling having a closure at its rearward end defining a compartment rearward of the engine into which cooling air flowing over the engine passes, said exit duct for said compartment, doors circumferentially disposed in said first cowling, forward of the engine, openable to bleed air from said reservoir to said air exit duct to prevent the by-passed air from flowing over the engine, and manually operable means for opening and closing said doors.

MAITLAND B. BLEECKER.
GODFREY B. SPEIR.